June 14, 1927.
J. BINGHAM
1,632,214
WHEEL HUB CONSTRUCTION
Filed Jan. 18, 1926
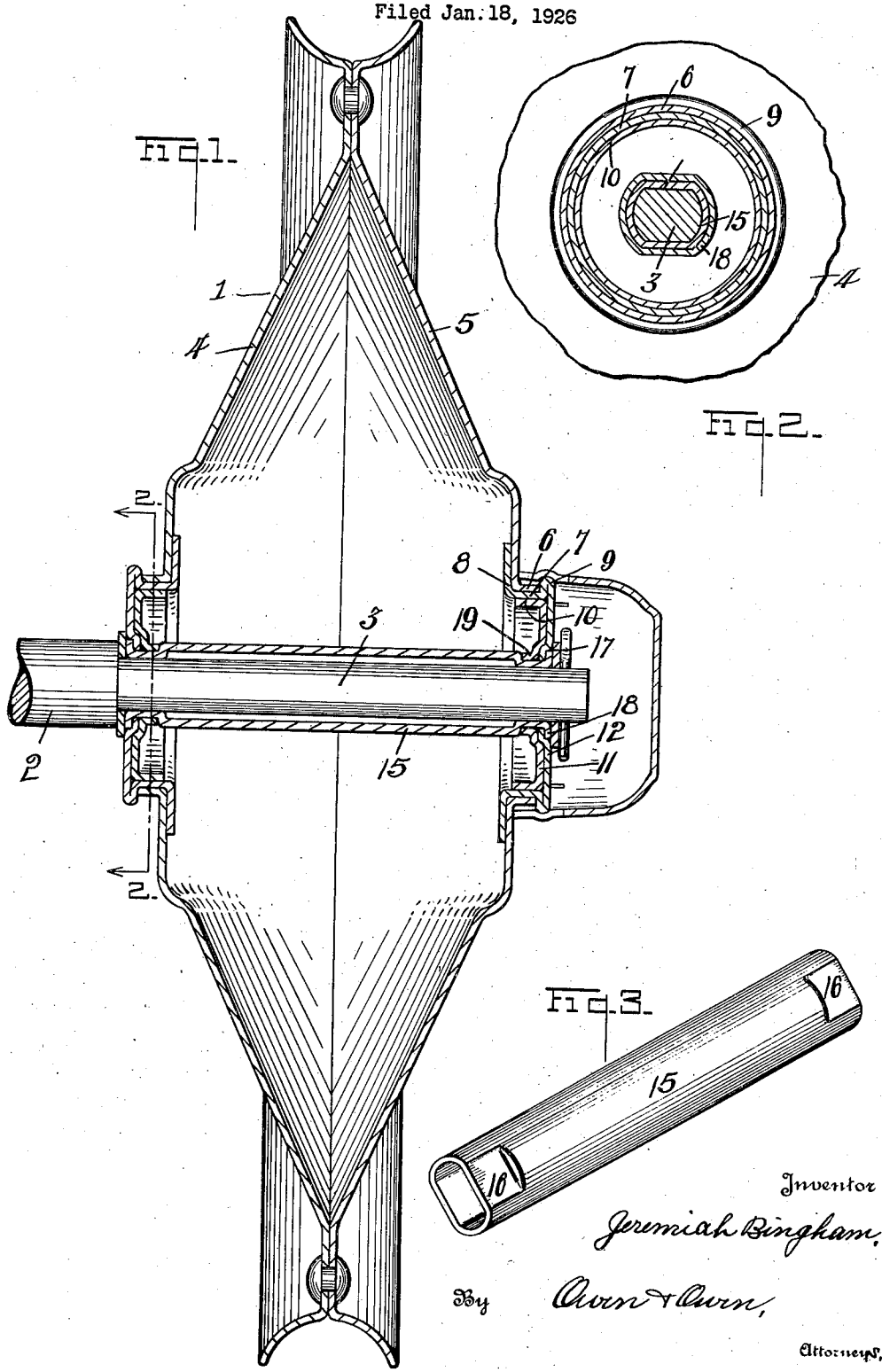
Inventor
Jeremiah Bingham,
By Owen & Owen,
Attorneys.

Patented June 14, 1927.

1,632,214

UNITED STATES PATENT OFFICE.

JEREMIAH BINGHAM, OF TOLEDO, OHIO, ASSIGNOR TO THE BINGHAM STAMPING & TOOL COMPANY, OF TOLEDO, OHIO, A CORPORATION OF OHIO.

WHEEL-HUB CONSTRUCTION.

Application filed January 18, 1926. Serial No. 81,889.

This invention relates to wheels, pulleys, rollers, or the like, of the disc type and primarily has for its object the provision of a simple, novel, strong and durable hub construction for articles of this class adapted for use as driven members where the driving torc is applied through the hub.

The invention is fully described in the following specification, and while in its broader aspect it is capable of embodiment in different forms, a preferred embodiment thereof is illustrated in the accompanying drawings, in which,—

Figure 1 is a central sectional view of a wheel embodying the invention with the section taken longitudinally through the wheel axis and with an axle in driving connection therewith. Fig. 2 is a section taken on the line 2—2 in Fig. 1, and Fig. 3 is a perspective view of the hub sleeve before being assembled in the hub.

Referring to the drawings, 1 designates an article embodying the invention, which for convenience will hereinafter be referred to as a wheel, and 2 an axle or shaft which has its wheel carrying end or spindle portion 3, in the present instance, other than circular in cross-section and fitting into corresponding openings in the hub ends of the wheel to cause a rotation of one to drive the other. In the present instance, the spindle portion 3 of the axle has two opposed sides flattened.

The wheel 1 has the opposing discs 4 and 5 each provided at its central portion with an opening with the inner marginal edge portion of each disc turned outwardly to form a cylindrical flange 6, which is spaced a distance from the axis of the wheel. A cup-shaped member 7 has its cylindrical portion fitted within the flange 6 and has portions outwardly flanged at opposite ends of the flange 6 and in engagement therewith to prevent relative axial movements of the parts. In the present instance, the free end of the member 7 is turned outwardly to form a flange 8 that bears outwardly against the inner marginal edge portion of the respective wheel disc, and the portion of the cup member at the outer end of the flange 6 is formed with a radial loop or flange 9 for engagement with the outer free end of the flange 6.

A second cylindrical cup member 10 is fitted into the cylindrical portion of the cup member 7 from the inner side of the associated wheel disc and with its closed end portion 11 bearing flat against the closed portion 12 of the member 7.

The two cup members 7 and 10 for each disc have the closed end portions 11 and 12 thereof formed with aligned centrally disposed openings for receiving and forming a bearing for the adjacent end of a hub sleeve 15. This sleeve is of an internal diameter substantially corresponding to the external diameter of the axle spindle 3, and in order to prevent a relative turning of the sleeve and spindle the former is formed at its ends at least with opposed flattened portions 16, which fit the flattened portions of the spindle. These flattened portions of the sleeve preferably are provided in the portions thereof which project through the bearing openings of the cup members 7 and 10, and in order to cause a driving engagement of the sleeve with said members, or vice versa, the openings in the members are of a shape corresponding to the flattened end portions of the sleeve. The inner marginal edge portions of the cup ends 11 and 12, in the present instance, are inwardly offset to form a countersink 17 in the portion 12 for receiving the outwardly spun or flanged edge 18 of the adjacent sleeve end. It is preferable in practice to inwardly flange the inner marginal edge of the member 10, as shown at 19, to provide a broadened bearing or surface engagement of the members 7 and 10 with the sleeve.

It is evident that by constructing the hub portion of the wheel in the manner shown and described it is rendered very strong and durable and is at the same time comparatively inexpensive as the parts are all preferably stamped from sheet metal and are adapted to be easily and quickly assembled.

I wish it understood that my invention is not limited to any specific construction, arrangement or form of the parts as it is capable of embodiment in numerous forms without departing from the spirit of the claims.

Having thus described my invention, what I claim as new and desire to secure by Letters Patent is:

1. A disc wheel having a central opening in a disc thereof, a stamped hub member fitting in the disc opening and having a central hub-sleeve bearing opening and a flange portion lapping the inner portion of the disc and fixed thereto, a hub sleeve fitting in the opening of said hub member, said hub sleeve and the opening in which it fits being other than circular in cross-section to cause a turning of one with the other, an axle mounted in said sleeve and having driving engagement therewith, and means connected to the disc and forming a separate support for the hub sleeve.

2. In combination, a disc wheel having a central opening in a disc thereof, a cup member mounted within the disc opening and anchored to the disc without said opening, said member having its closed end portion provided with a hub sleeve receiving opening of irregular form in cross-section, a hub sleeve having an end corresponding in shape to the cup member opening and fitting therein whereby one has driving engagement with the other, an axle mounted in the sleeve and having driving coaction therewith, and means connected to the disc and forming a separate support for the hub sleeve.

3. In combination, an axle spindle having a flattened side portion, and a wheel, said wheel being of the disc type and its hub portion comprising a sleeve having an end portion flattened to correspond to the flattened portion of the spindle whereby one has driving coaction with the other, a bearing member for the sleeve end having a bearing opening corresponding in shape and adapted to receive the flattened end portion of the hub sleeve so that one has driving coaction with the other, said member having its outer marginal portion lapping a disc of the wheel and anchored thereto, and means connected to the disc and supporting the other end of the hub sleeve.

4. In combination, a disc wheel having a central opening in each disc, a plurality of cup members for each disc mounted one within the other and within the opening of the respective disc, the cup members having aligned central openings of irregular form in cross-section, and a hub sleeve having its ends fitting into the openings of the respective cup members and having the irregular form of said openings, the hub sleeve being adapted to receive and have driving engagement with an axle spindle.

5. A disc wheel having opposed discs with an opening in the center of each and with the inner marginal edge wall of the opening flanged outwardly, a pair of cylindrical cup-shaped members for each disc mounted one within the other and having the cylindrical portion of the outer member fitting into the flange of the disc, the closed end portions of the cup members having aligned central openings of other than true circular form, and a hub sleeve having its ends conforming to and fitting in the openings of the respective pair of cup members and secured to said members against relative axial movements, said sleeve adapted to receive an axle spindle and having portions for coacting therewith and causing a turning of the sleeve with the spindle.

6. A disc wheel having opposed discs with their central portions axially spaced and each provided with a central opening, stamped sheet metal bearing means mounted in each disc opening and having rigid engagement with the respective disc in spaced relation outwardly from the opening, and a hub sleeve having its ends mounted in and supported by the respective bearing means and anchored against turning movements relative to the means, said sleeve adapted to receive an axle spindle and to coact therewith to prevent a turning of one relative to the other.

7. In combination, a disc wheel having opposed discs with the central portions thereof axially spaced and each provided with a central opening, bearing means mounted in each opening and anchored to the respective disc without the opening, a tubular sleeve having flattened portions at the ends thereof, which flattened end portions are mounted within the respective bearing means and caused to turn therewith, and an axle spindle mounted in the sleeve and having flattened portions coacting with the flattened portions of the sleeve.

In testimony whereof I have hereunto signed my name to this specification.

JEREMIAH BINGHAM.